(12) United States Patent
Bartling et al.

(10) Patent No.: US 11,938,756 B2
(45) Date of Patent: Mar. 26, 2024

(54) GRANULAR MATERIAL METERING DEVICE AND METHOD

(71) Applicant: NOWE GMBH, Elze (DE)

(72) Inventors: Werner Bartling, Elze (DE); Alexander Reich, Meerbusch (DE); Ralf Weiss, Gronau ot Banteln (DE)

(73) Assignee: NOWE GMBH, Elze (DE)

( * ) Notice: Subject to any disclaimer, the term of this patent is extended or adjusted under 35 U.S.C. 154(b) by 273 days.

(21) Appl. No.: 17/415,933

(22) PCT Filed: Jan. 9, 2020

(86) PCT No.: PCT/EP2020/050349
§ 371 (c)(1),
(2) Date: Jun. 18, 2021

(87) PCT Pub. No.: WO2020/144246
PCT Pub. Date: Jul. 16, 2020

(65) Prior Publication Data
US 2022/0063332 A1  Mar. 3, 2022

(30) Foreign Application Priority Data
Jan. 11, 2019 (AT) .............................. A 50019/2019

(51) Int. Cl.
*B60B 39/06* (2006.01)
*B60B 39/02* (2006.01)
(Continued)

(52) U.S. Cl.
CPC ............ *B60B 39/025* (2013.01); *B60B 39/06* (2013.01); *B60B 39/086* (2013.01); *B60B 39/10* (2013.01);
(Continued)

(58) Field of Classification Search
CPC ..... B60B 39/025; B60B 39/06; B60B 39/086; B60B 39/10; B60B 39/023; B60B 39/04;
(Continued)

(56) References Cited

U.S. PATENT DOCUMENTS 6,938,935 B2  9/2005 Bartling
RE40,735 E   6/2009 Bartling
(Continued)

FOREIGN PATENT DOCUMENTS

DE         124021 C    10/1901
DE    102005010573 A1   9/2005
(Continued)

OTHER PUBLICATIONS

International Search Report dated Mar. 23, 2020 with Written Opinion for PCT/EP2020/050349 filed Jan. 9, 2020.
(Continued)

*Primary Examiner* — Mark T Le
(74) *Attorney, Agent, or Firm* — The Small Patent Law Group LLC; Philip S. Hof

(57) ABSTRACT

A method for controlling a device for metering granular material and a metering device for metering granular material comprises a feed for the granular material from a container into a metering chamber. A metering piston can be actuated by a control device such that a gap between the feed and the metering chamber is opened by a predefined first distance and a second distance which is greater than the first distance. At least one sensor is arranged in a delivery line leading away from the metering chamber and is connected to the control device so that the metering piston can be actuated for a predefined duration such that the gap between the feed for the granular material and the metering chamber can be opened by the second distance if a blockage of the
(Continued)

granular material is detected by the at least one sensor, so that the blockage is dispersed.

15 Claims, 3 Drawing Sheets

(51) Int. Cl.
   *B60B 39/08* (2006.01)
   *B60B 39/10* (2006.01)
   *B61C 15/10* (2006.01)
   *G01F 11/00* (2006.01)
   *G01F 11/02* (2006.01)

(52) U.S. Cl.
   CPC .......... *B61C 15/102* (2013.01); *B61C 15/107* (2013.01); *G01F 11/003* (2013.01); *G01F 11/023* (2013.01)

(58) Field of Classification Search
   CPC ... B60B 39/021; B61C 15/102; B61C 15/107; B61C 15/10; B61C 15/105; B61C 15/08; G01F 11/003; G01F 11/023; G01F 11/021; B60Y 2200/30
   See application file for complete search history.

(56) References Cited

U.S. PATENT DOCUMENTS

| 8,500,177 | B2 | 8/2013 | Bartling | |
|---|---|---|---|---|
| 9,637,140 | B2 | 5/2017 | Bartling | |
| 2009/0302192 | A1* | 12/2009 | Erhard | B05B 12/02 249/115 |
| 2011/0187128 | A1* | 8/2011 | Bartling | B61C 15/107 291/23 |
| 2021/0146966 | A1* | 5/2021 | Reich | B61C 15/102 |

FOREIGN PATENT DOCUMENTS

| DE | 102011113070 A1 * | 3/2013 | ........... B60B 39/025 |
|---|---|---|---|
| DE | 102014112742 A1 | 8/2015 | |
| EP | 0936084 B1 | 9/2003 | |
| WO | 03033279 A1 | 4/2003 | |
| WO | 2010084085 A1 | 7/2010 | |
| WO | 2015055723 A1 | 4/2015 | |

OTHER PUBLICATIONS

Office Action of the Austrian Priority Application dated May 8, 2019 for Austrian Application No. A 50019/2019, filed Jan. 11, 2019 (2 pages).

International Preliminary Report on Patentability, dated Mar. 30, 2021, for PCT/EP2020/050349 filed Jan. 9, 2020 (English translation).

* cited by examiner

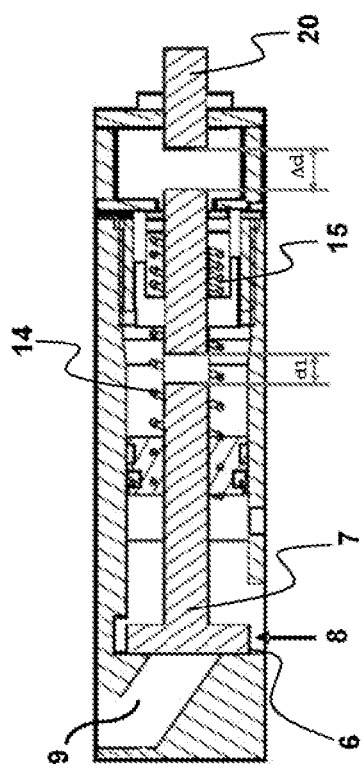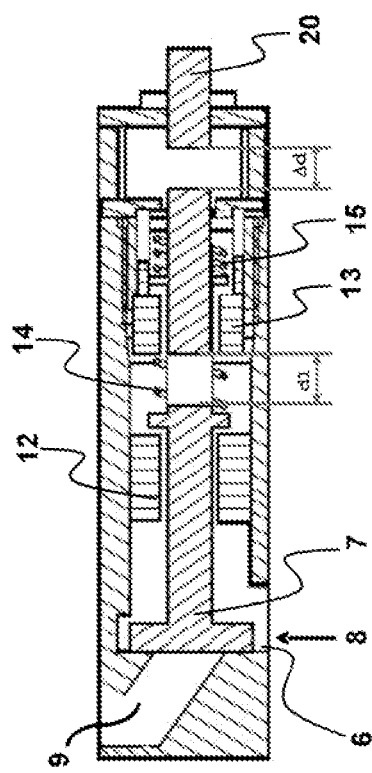

GRANULAR MATERIAL METERING DEVICE AND METHOD

FIELD OF THE INVENTION

The invention relates to a method for controlling a device for metering granular material, in particular sand to increase the friction coefficient between a rail wheel and a rail, wherein the granular material is fed from a container and metered into a metering chamber, by actuating a metering piston, whereby a gap between a feed for the granular material and the metering chamber is opened by a predefined first distance and the metering piston is temporarily actuated in such a manner that the gap between the feed for the granular material and the metering chamber is opened by a second distance which is greater than the first distance.

The invention further relates to a metering device for metering granular material, in particular sand to increase the friction coefficient between a rail wheel and a rail, comprising a feed for the granular material from a container and into a metering chamber, wherein a metering piston can be actuated via a control device in such a manner that a gap between the feed for the granular material and the metering chamber is opened by a predefined first distance and a second distance which is greater than the first distance.

BACKGROUND OF THE INVENTION

In particular, in the case of rail vehicles it is usual to increase the static friction between vehicle wheel and rail head for the approach or a braking process by spreading granular material, in particular sand into the gap between rail and rail wheel. For this purpose, such spreading devices are arranged in front of the wheels of the rail vehicle and actuated via the vehicle control, for example, manually or in an automated manner. In this case, it is necessary to meter a suitable quantity of granular material from a container provided for this purpose and convey it via a corresponding delivery line to the gap between rail and wheel.

However, also in the case of vehicles which are not bound to rails, granular material, in particular sand, can be spread between the wheels and the ground and in particular on slippery ground the approach can be facilitated or braking improved.

For example, EP 0 936 084 B1 describes a piston-controlled metering device for a spreading device, wherein the metering of the quantity of granular material is adjusted via the opening gap between metering piston and outlet opening of the metering chamber.

A metering device for granular material has become known from WO 2015/055723 A1, wherein the metering piston is configured by means of compressed air to be two-stage so that the stroke of the metering piston can be varied by varying the pressure of the compressed air at least in two stages.

DE 124021 C also describes an embodiment of a sand-spreading device for rail vehicles with a two-stage control of the metering.

In the case of high-quality granular material with very regular dimensions, a very good metering of the granular material can be achieved via the position of the metering piston and the adjustment of the gap width and preferably no more granular material than necessary can be used. Also as a result of the existing problems of track circuit insulation, the quantity of dispensed granular material can be kept as low as possible. This has the result that the opening gap must be correspondingly small. The normatively specified dispensed quantity of granular material is usually defined in conjunction with a specific quality of the granular material or spreading material and the quantity of dispensed granular material is adjusted according to the respective quality of the specified granular material at the piston-controlled metering device. If the quality of the granular material deviates, in particular in the case of coarser particles, this can result in blockage or obstruction and thus in an interruption of the spreading of granular material.

SUMMARY OF THE INVENTION

One aspect of the present invention relates to creating an aforesaid method for controlling a metering device and an aforesaid metering device for metering granular material, in particular sand to increase the coefficient of friction between a rail wheel and a rail which avoids or at least reduces the above-described problem of a blockage, in particular in the case of granular material of various quality. The method should be as easy as possible to implement and the device should be as inexpensive as possible to achieve. In addition, it should be possible to retrofit existing metering devices at low cost.

Accordingly, a method is disclosed herein whereby the metering piston is actuated for a predefined duration in such a manner that the gap between the feed for the granular material and the metering chamber is opened by the second distance if a blockage of the granular material is detected so that the blockage is dispersed. By this easy-to-implement method, detected blockages can be dispersed relatively easily and if necessary, an optimal spreading of the granular material can always be ensured. The method is very easy to implement since the metering piston is moved for the predefined or predetermined duration further away from the feed for the granular material than during usual metering when a blockage is detected. The blockage can be detected using appropriate sensors. The further opening of the gap between feed for the granular material and metering chamber is only performed when a blockage occurs and this must be dispersed. As a result, the consumption of granular material can be reduced to a minimum and thus costs can be saved and contamination of the environment reduced. The gap between the feed for the granular material and the metering chamber is opened further by a short pulse and then returned immediately into the original position again.

Preferably the gap between the feed for the granular material and the metering chamber is opened by the second distance for a predefined duration of 100 ms to 1 s. According to experience, an opening of the gap for such a duration is sufficient to be able to effectively disperse a blockage. After this short duration, the metering device is again fully operational and an effective metering and delivery of the granular material to the desired location, in particular the gap between rail wheel and rail of a rail-bound vehicle, can be made.

A blockage of the granular material can be detected by at least one sensor, wherein the at least one sensor is arranged in a delivery line leading away from the metering chamber. In this way, the quantity of delivered granular material can be estimated by means of corresponding sensors, for example, optical sensors. If a certain threshold value of a signal detected by a sensor is fallen below or a certain signal form of the sensor is present, the presence of a blockage can then be concluded. The certainty of the detection of a blockage can be increased by using a plurality of, if necessary, different sensors.

The metering piston can be actuated pneumatically wherein two different pressures are used for the actuation of the metering piston. Such pneumatic methods are known in spreading devices of the prior art. As a result of the presence of compressed air, if necessary also at different pressures, the present method can be implemented very simply and can also be retrofitted in existing spreading devices. In the case of pneumatic actuation, the metering piston is preferably moved against corresponding return springs.

The metering piston can also be actuated electromagnetically by two lifting magnets. Such electromagnetic methods can be used when no compressed air source is present or connection to the pneumatics would be expensive. In the case of an electromagnetic activation by two lifting magnets, the opening of the gap between the feed for the granular material and the metering chamber is accomplished by supply of current to the lifting magnets. When one lifting magnet is activated, the gap is opened by the first distance for a normal metering of the granular material whereas when the second lifting magnet is activated, an opening of the gap by the second distance for a dispersal of the blockage results.

Also disclosed herein is a metering device, wherein at least one sensor is arranged in a delivery line leading away from the metering chamber and is connected to the control device so that the metering piston can be actuated for a predefined duration in such a manner that the gap between the feed for the granular material and the metering chamber can be opened by the second distance if a blockage of the granular material is detected by the at least one sensor so that the blockage is dispersed. Such a metering device can be implemented or retrofitted relatively easily and cost-effectively and a problem-free functioning of the metering device can be ensured. In addition, reference is made to the above description of the method for controlling a device for metering granular material.

According to a further feature of the invention, the second distance of the gap can be adjusted by means of an adjusting screw. As a result, the effect of dispersing the blockage can be improved without too much granular material being consumed during the further opening of the gap.

At least one sensor can be formed by an optical sensor. Such sensors are available particularly cheaply and also require little space. In principle, however, other sensor technologies can also be used.

If the metering piston is connected to at least one return spring, the movement of the metering piston can be accomplished by corresponding application of energy, for example, pneumatically or electromagnetically, whereas the metering piston is brought into the closed position by at least one return spring automatically and without application of energy.

For pneumatic actuation the metering piston can be connected to two compressed air lines for two different pressures wherein at least one valve connected to the control device is provided.

Alternatively to the pneumatic implementation, for electromagnetic actuation the metering piston can be connected to two lifting magnets which lifting magnets are connected to the control device.

BRIEF DESCRIPTION OF THE DRAWINGS

The present invention is explained in detail with reference to the appended drawings. In the drawings:

FIG. 2 shows an embodiment of a metering device with pneumatically actuated metering piston;

FIG. 3 shows a further embodiment of a metering device with electromagnetically actuated metering piston;

DETAILED DESCRIPTION OF THE INVENTION

Figure 1:
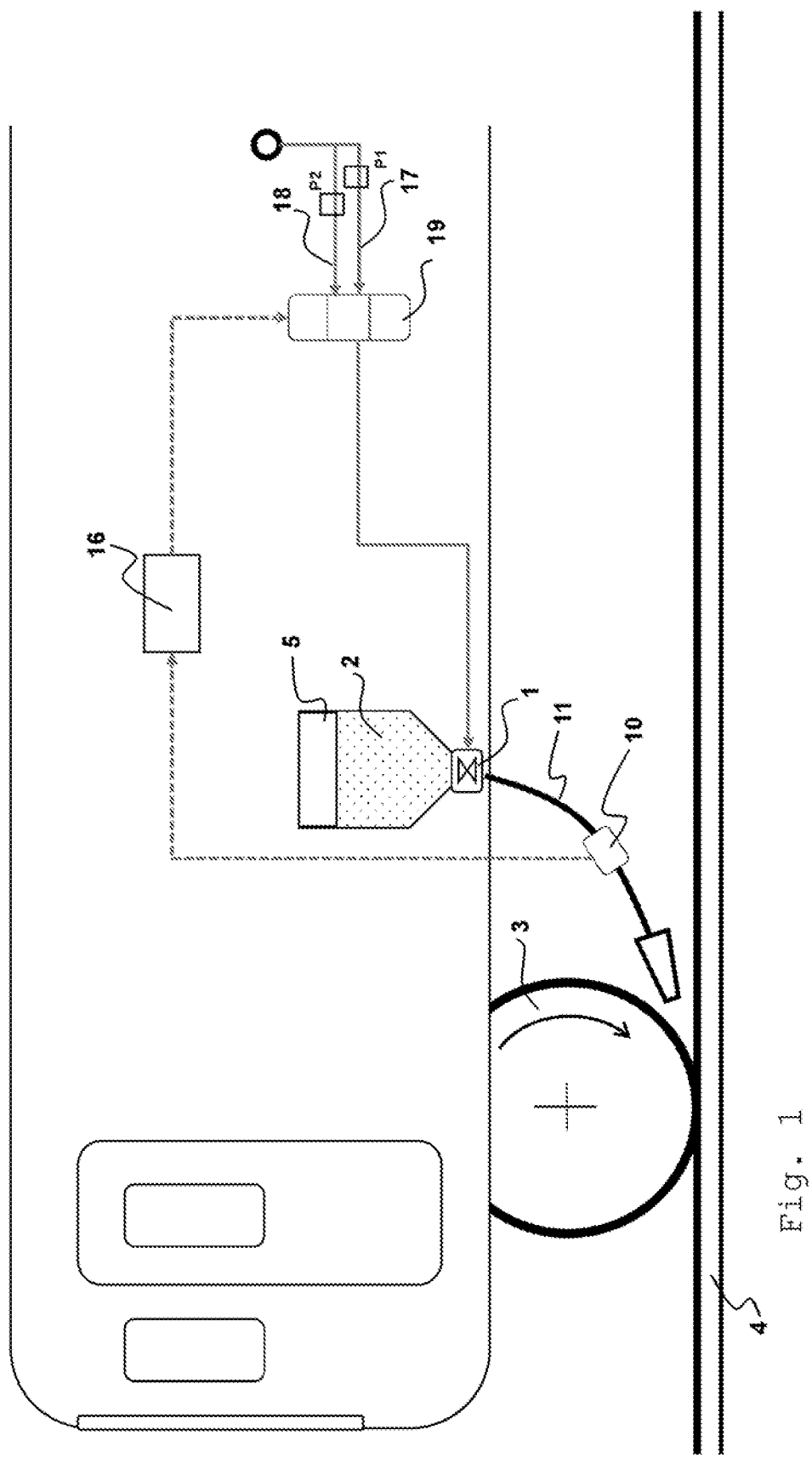
FIG. 1 shows a schematic device for metering granular material into the gap between rail wheel and rail to increase the coefficient of friction.

FIG. 1 shows a device 1 for metering granular material 2, in particular sand, into the gap between rail wheel 3 and rail 4 to increase the coefficient of friction. The device 1 for metering granular material 2 is connected underneath a container 5 for the granular material 2 and meters a desired quantity of granular material 2. The desired granular material 2 is delivered via a delivery line 10 into the gap between wheel 3 of a rail vehicle and rail 4 in order to increase the friction between wheel 3 and rail 4. The metering device 1 is controlled via a control device 16 which in the depicted example is connected to a valve 19 via which a compressed air line 17 for a first pressure $p_1$ or a compressed air line 18 for a pressure $p_2$ that is higher than the first pressure $p_1$ is opened pneumatically. If a sensor 10 is arranged in the delivery line 11 which is connected to the control device 16, the metering device 1 can be controlled or regulated depending on a blockage detected by the at least one sensor 10 and then, whenever a blockage is detected, a pulse having the higher second pressure $p_2$ is delivered to the metering piston 7 of the metering device 1 to disperse the blockage.

FIG. 2 shows an embodiment of a metering device 1 with pneumatically actuated metering piston 7. In this case, the metering piston 7 is moved away from the feed 9 for the granular material 2 against the first return spring 14 by application of compressed air at a first pressure $p_1$ with the result that the gap 8 is opened by a first distance $d_1$. In this way, a normal desired metering of the granular material 2 into the metering chamber 6 takes place. When detecting a blockage or at predefined time points $t_1$ or in predefined time intervals $\Delta t_i$, the metering piston 7 can be actuated for a predefined duration $\Delta t$ in such a manner that the gap 8 between the feed 9 for the granular material 2 and the metering chamber 6 is opened by a second distance $d_2$ which is greater than the first distance $d_1$, namely $d_1+\Delta d$ so that any blockages are dispersed. The second distance $d_2$ or the additional distance $\Delta d$ can, for example, be configured to be adjustable by an adjusting screw 20. Depending on the quality of the granular material 2, the distance $d_1$ can, for example, be 5 mm and the greater distance $d_2$ can, for example, be 7 mm.

FIG. 3 shows a further embodiment of a metering device 1 with electromagnetically actuated metering piston 7. In this case, the metering piston 7 is moved against the first return spring 14 by activation of a first lifting magnet 12 with the result that the gap 8 is opened by a first distance $d_1$. In this way, a normal desired metering of the granular material 2 into the metering chamber 6 is achieved. When a blockage is detected or at predefined time points $t_i$ or in predefined time intervals $\Delta t_i$, the metering piston 7 can be actuated for a predefined duration $\Delta t$ by actuating the second lifting magnet 13 in such a manner that the gap 8 between the feed 9 for the granular material 2 and the metering chamber 6 is opened by a second distance $d_2$, which is greater than the first distance $d_1$, namely $d_1+\Delta d$, so that any blockages are dispersed.

Figure 4:
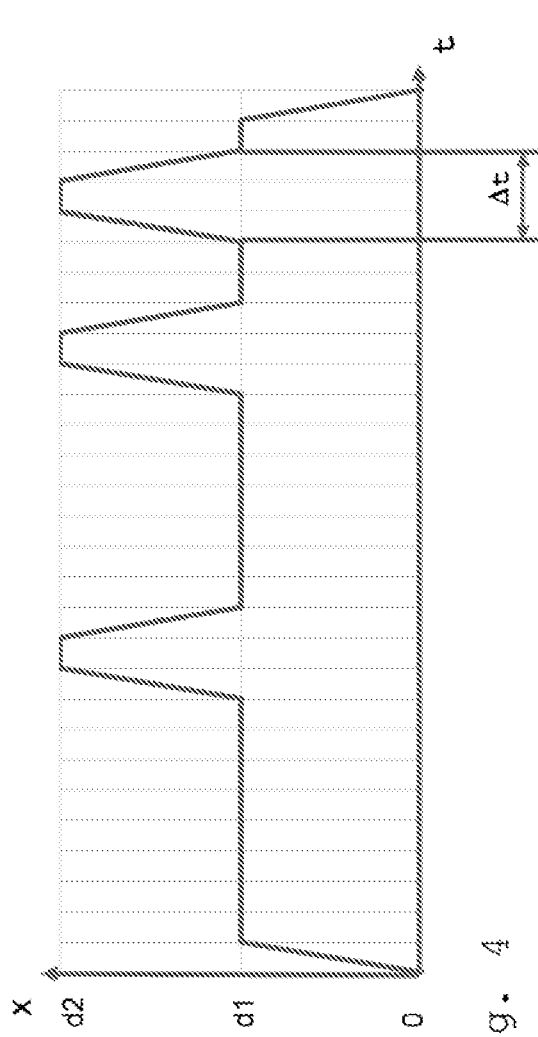
FIG. 4 shows a time diagram of the control of the metering piston to disperse a blockage depending on the detection of a blockage.

FIG. 4 shows a time diagram of the control of the metering piston 7 for dispersing a blockage depending on the detection of a blockage. Whenever a blockage is detected, an opening of the distance x of the metering piston 7 to the greater distance $d_2$ is accomplished during a predefined duration $\Delta t$. This variant is characterized by a minimal additional consumption of granular material 2, wherein the somewhat higher expenditure of a detection of the blockage by corresponding sensors 10 must be accepted.

Figure 5:
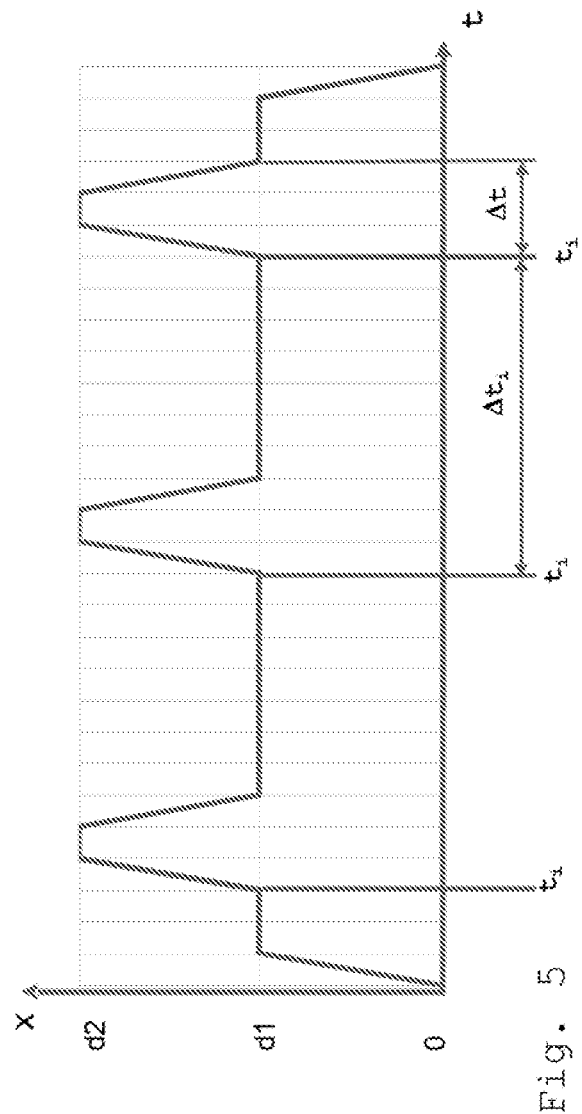
FIG. 5 shows a time diagram of the control of the metering piston to disperse a blockage according to a predefined time grid.

Finally FIG. 5 reproduces a time diagram of the control of the metering piston 7 to disperse a blockage according to a predefined time grid. In this case, the metering piston is opened by the second greater distance $d_2$ at predefined time points $t_i$ or predefined time intervals $\Delta t_i$. This variant is simpler compared with that shown in FIG. 4 but is associated with a higher consumption of granular material 2.

The present method for controlling a device 1 for metering granular material 2 and the present metering device 1 makes it possible to achieve an optimal function even in the presence of granular material having different quality since any blockages which occur can be dispersed rapidly and effectively.

The invention claimed is:

1. A method, comprising:
actuating a metering piston of a metering device to form a gap between a feed of the metering device and a metering chamber of the metering device, the feed configured to receive granular material from a container, the gap configured to permit the granular material to flow from the feed to the metering chamber;
detecting a blockage of the granular material with at least one optical sensor arranged in a delivery line leading away from the metering chamber; and
responsive to detecting the blockage, actuating the metering piston to enlarge the gap between the feed and the metering chamber to disperse the blockage.

2. The method of claim 1, further comprising:
actuating the metering piston to reduce the gap after a predefined duration following actuating the metering piston to enlarge the gap.

3. The method according to claim 2, wherein the predefined duration is a value no less than 100 ms and no greater than 1 s.

4. The method according to claim 1, wherein the metering piston is pneumatically actuated using compressed air.

5. The method according to claim 4, wherein actuating the metering piston to form the gap having the first size comprises controlling a valve to supply a first pressure of compressed air to the metering device, and actuating the metering piston to enlarge the gap comprises controlling the valve to supply a larger second pressure of the compressed air to the metering device.

6. The method according to claim 1, wherein the metering piston is electromagnetically actuated by lifting magnets.

7. The method according to claim 1, wherein actuating the metering piston comprises moving the metering piston against a return spring away from a closed position, wherein the metering piston closes the gap between the feed and the metering chamber while in the closed position.

8. The method according to claim 1, further comprising:
delivering the granular material via the delivery line to an interface between a rail and a wheel to change friction between the rail and the wheel.

9. A system comprising:
a metering device comprising:
a feed configured to receive granular material from a container;
a metering chamber configured to direct the granular material into a delivery line leading away from the metering chamber; and
a metering piston configured to control flow of the granular material between the feed and the metering chamber;
at least one optical sensor arranged in the delivery line; and
a control device operably connected to the metering device and the at least one optical sensor, the control device configured to actuate the metering piston to form a gap between the feed and the metering chamber to permit the granular material from the feed to the metering chamber, the control device configured to detect a blockage of the granular material based on the at least one optical sensor, and to actuate the metering piston to enlarge the gap between the feed and the metering chamber to disperse the blockage.

10. The system according to claim 9, wherein the metering device comprises an adjusting screw that is adjustable to change a size of the gap.

11. The system according to claim 9, wherein the metering piston is connected to at least one return spring that biases the metering piston towards a closed position that closes the gap between the feed and the metering chamber.

12. The system according to claim 9, further comprising:
at least one valve connected to the control device, the control device configured to control the at least one valve for pneumatic actuation of the metering piston.

13. The system according to claim 12, wherein the control device is configured to actuate the metering piston to form the gap by controlling the at least one valve to supply a first pressure of compressed air to the metering device, and the control device is configured to actuate the metering piston to enlarge the gap by controlling the at least one valve to supply a larger second pressure of the compressed air to the metering device.

14. The system according to claim 9, wherein the metering device comprises lifting magnets connected to the control device, the control device configured to independently control power to the lifting magnets for electromagnetic actuation of the metering piston.

15. The system according to claim 9, wherein the control device is configured to actuate the metering piston to reduce the gap after a predefined duration following actuating the metering piston to enlarge the gap.

* * * * *